UNITED STATES PATENT OFFICE.

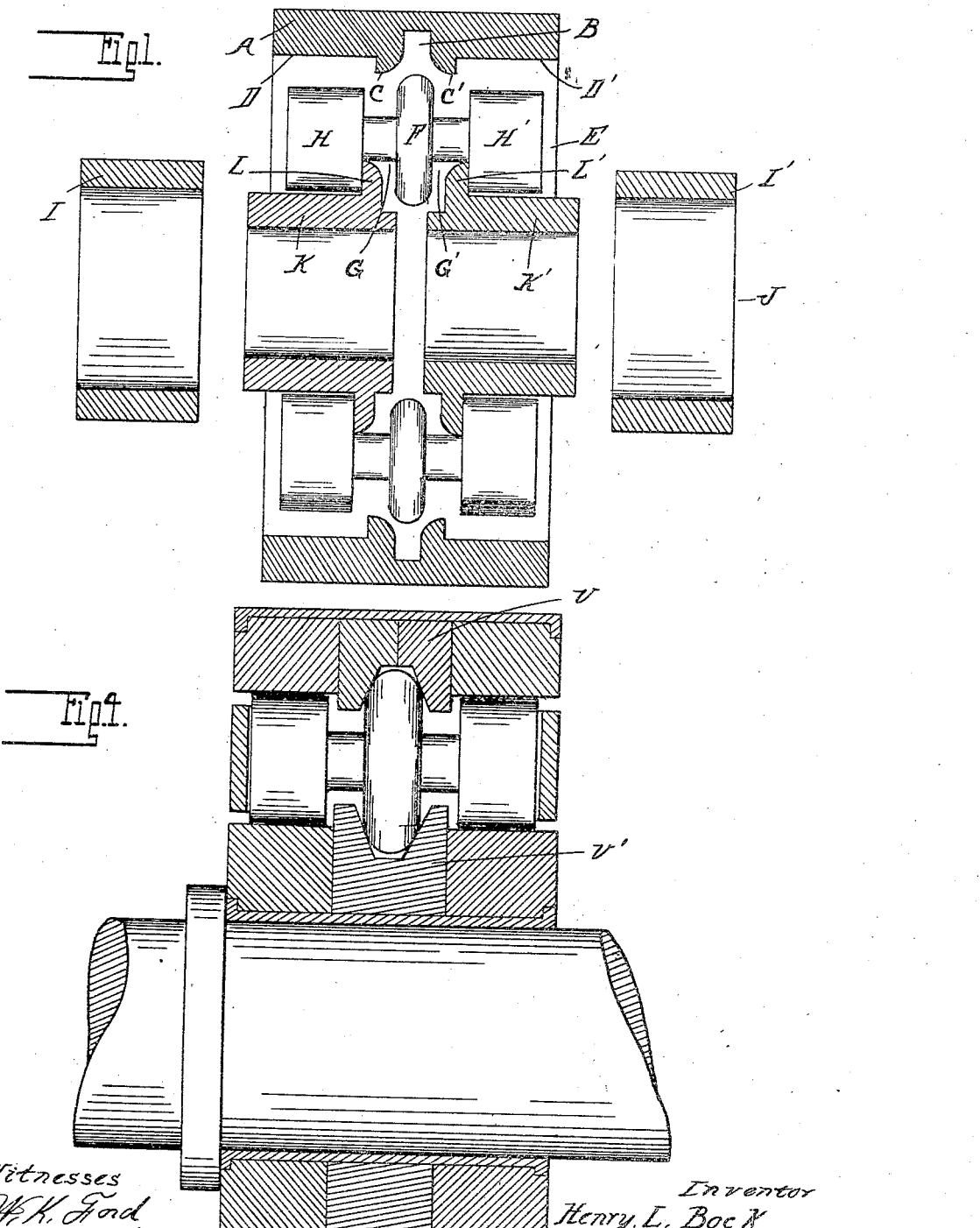

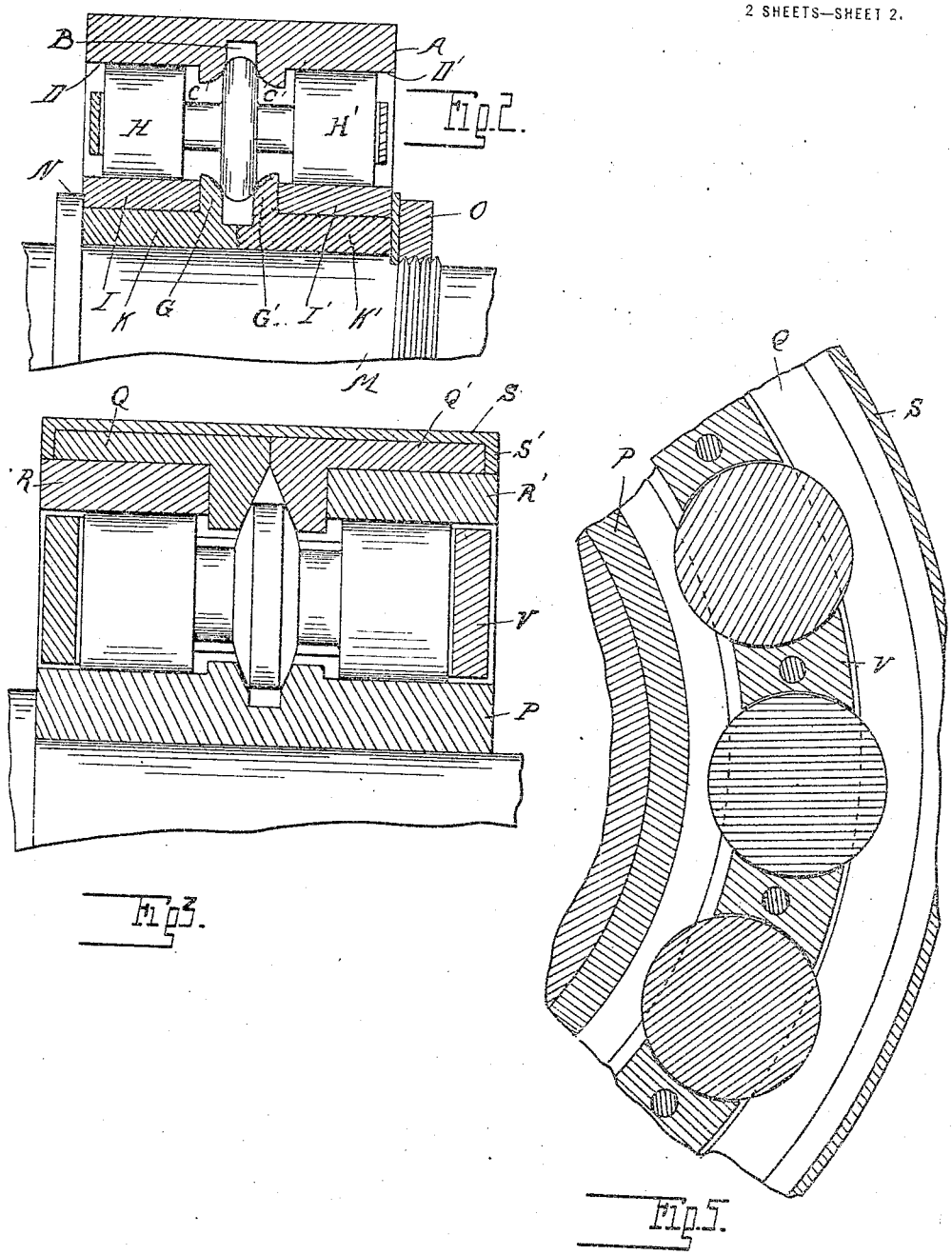

HENRY L. BOCK, OF TOLEDO, OHIO, ASSIGNOR TO WILLIAM EMIL BOCK, OF TOLEDO, OHIO.

ROLLER-BEARING.

1,177,598.    Specification of Letters Patent.    Patented Apr. 4, 1916.

Application filed June 28, 1913. Serial No. 776,271.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings of that type adapted to carry both radial and end thrust loads, and it is the particular object of the invention to obtain a construction that may be easily manufactured and assembled, and which in operation will maintain the same speed ratio between all contacting surfaces.

In the drawings: Figure 1 is a central longitudinal section through the bearing when partly assembled, showing the manner of engaging the parts; Fig. 2 is a similar view through the completely assembled bearing; Fig. 3 is a view similar to Fig. 2 showing a modified construction; Fig. 4 is a similar view showing still another modification; and Fig. 5 is a section in a plane at right angles to that of Fig. 3.

My improved bearing is of that type in which the radial load is carried by cylindrical rollers, and the end thrust by enlarged portions upon said rollers, which engage grooves in the race members, the line of contact being in the projection of the cylindrical surface so as to preserve the same ratio of speed. By reason of the enlargements, the rollers cannot be engaged with their race members by an endwise movement only, and I have therefore devised a construction for facilitating assembly of the parts as follows:

A is an annular race member having a central groove B, ribs C and C' on opposite sides thereof, and cylindrical radial load sustaining surfaces D and D' on opposite sides of said ribs.

E are rollers which are centrally provided with enlargements F for engaging the groove B, grooves G and G' for receiving the ribs C and C' and cylindrical end portions H and H' for engaging the cylindrical race portions D and D'.

The sides of the groove B and ribs C and C', as well as the sides of the enlargement F of the roller, are so fashioned as to provide convex surfaces contacting in alinement with the cylindrical contacting faces D D' and H H', and thereby avoiding any differential speed ratio between the contacting parts.

Upon the opposite side of the rollers from the cylindrical portions D and D' of the race member are corresponding cylindrical portions I and I' of a race member J, spaced from the race member A by a distance equal to the diameter of the cylindrical portions of the rollers. Inasmuch, however, as the assembly of the rollers with the race members necessitates a radial as well as an endwise movement, the cylindrical members I and I' cannot be integral with each other, but must be engaged with the rollers after the latter are assembled in relation to the race member A. The race member J is also provided with a grooved and ribbed portion corresponding to the groove B and ribs C and C', but this also must be made of separable sections to permit of assembly.

As shown in Fig. 1, K and K' are members provided with ribs L and L' corresponding to the ribs C and C' and engaging with the grooves G and G' of the rollers. The members K and K' are separable from the cylindrical members I and I', and when the latter are removed space is provided for the radial adjustment of the rollers to engage with the groove B. After this engagement, the members I and I' are sleeved on to the members K and K', which will hold the rollers against the race member A, as shown in Fig. 2. The members I I' and K K' are then clamped together by suitable means, such as a central shaft M on which they are mounted, having a collar N on one side and a clamping nut upon the opposite side of the race member.

With the construction shown in Fig. 3, in place of making the outer race member with the grooved, ribbed and cylindrical portions integral, an inner race member P is formed in this manner and the outer race member is formed of separable sections Q Q' and R R' corresponding to the sections K K' and I I'. These sections may be held in fixed relation after assembly of the parts by any suitable means, such as the peripheral band S, having flanges S' spun down over the ends of the members Q and Q'.

In Fig. 4, the cylindrical portions I of both the outer and inner race members are formed of separate sections, and the grooved portions U and U' are also formed of separate members clamped together after assembly of parts by suitable means.

After the bearing is assembled the rollers may be spaced from each other by a suitable cage or spacer V, as shown in Fig. 5, and which is insertible between the race members and the rollers.

The parts being constructed as described, in assembling the construction shown in Figs. 1 and 2, the rollers are first arranged around the members K and K', with their enlargements F between the ribs L and L'. In this position they are insertible within the race member A, sufficient clearance being provided for the enlargements F to pass the ribs C and C'. The rollers are then moved radially outward and the sleeve members I and I' are engaged with the members K and K', so as to hold the rollers in this position, after which the bearing may be engaged with the shaft M, and the clamping nut O secured to hold the members I I' K K' in fixed relation. When thus completely assembled, radial load is carried from the member A to the shaft M through the interposed rollers and cylindrical bearing faces D D' I I'; while end thrust is taken by the rib members C C' and L L', and the line of contact being in the projection of the cylindrical surfaces.

What I claim as my invention is:

1. A roller bearing, comprising a series of rollers provided with spaced cylindrical portions, central enlargements and grooves between said enlargements and cylindrical portions, and inner and outer race members having corresponding spaced cylindrical portions, ribs for engaging said grooves and a groove for receiving said enlargements, a rib and cylindrical portion of one of said race members being formed of separable sections to permit of assembly.

2. A roller bearing, comprising a series of rollers formed with spaced cylindrical portions, central enlargements and grooves between said enlargements and cylindrical portions, a race member upon one side of said rollers having corresponding cylindrical portions, a central groove to receive said enlargements and ribs upon opposite sides of said grooves engaging said grooves in the rollers and a race member on the opposite side of said rollers formed of separable sections forming the ribs and groove, and cylindrical sections telescoping said separable sections to form bearings adjacent to said ribs.

3. A roller bearing comprising a series of rollers each provided with cylindrical portions and a central enlargement with grooves between said portions and said enlargement, and inner and outer race members provided with cylindrical portions, a groove for receiving said enlargement and projections engaging said grooves in the roller, the points of contact between said enlargement and the walls of said groove being in substantial alinement with said cylindrical surfaces.

In testimony whereof I affix my signature in presence of two witnesses.

HENRY L. BOCK.

Witnesses:
JAMES P. BARRY,
DELBERT COLLINS.